Oct. 13, 1925.	1,556,980
F. K. VIAL
MOLDING MACHINE
Filed April 4, 1921   5 Sheets-Sheet 1

Oct. 13, 1925.

F. K. VIAL

MOLDING MACHINE

Filed April 4, 1921

Inventor
Frederick K. Vial
By: Munday, Clarke & Carpenter
Attys

Oct. 13, 1925.

F. K. VIAL

MOLDING MACHINE

Filed April 4, 1921    5 Sheets-Sheet 4

1,556,980

Inventor
Frederick K. Vial
By: Munday, Clarke & Carpenter
Attys

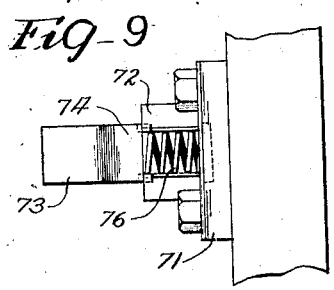
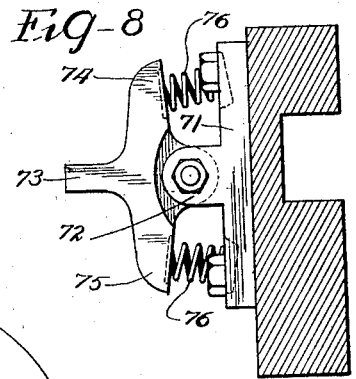
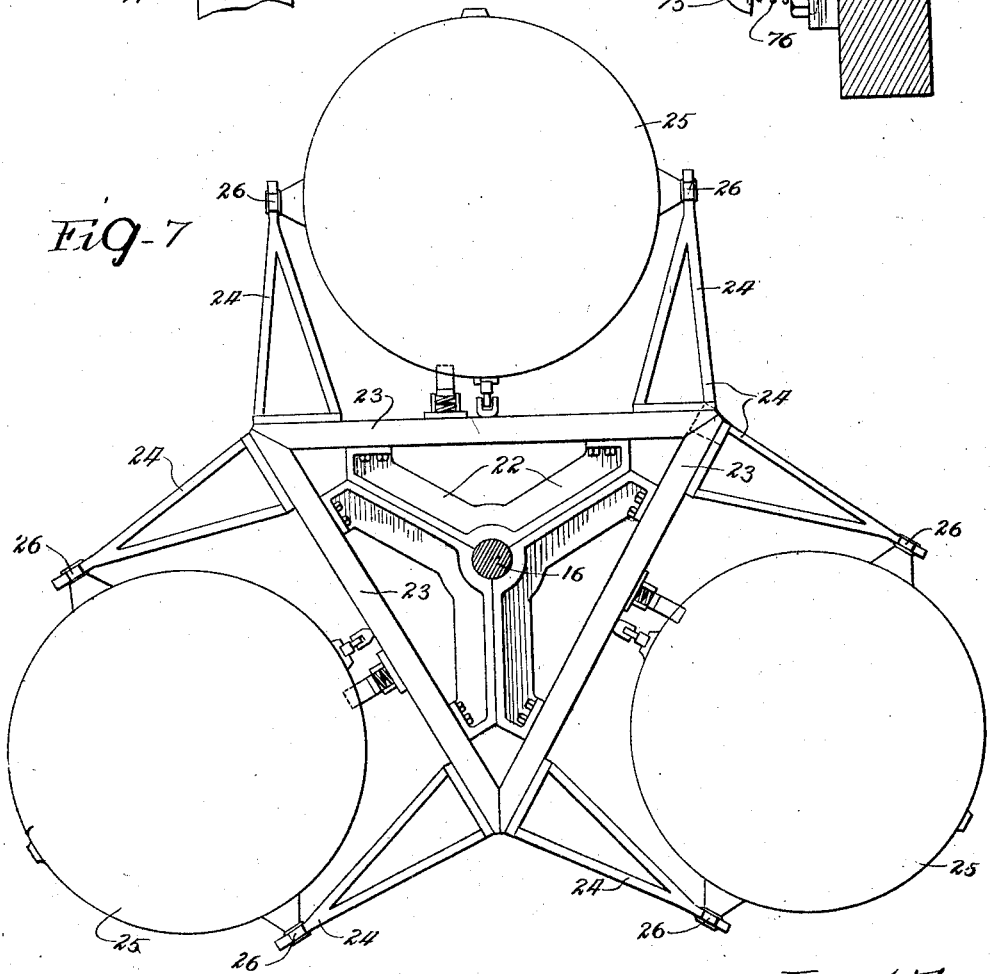

Patented Oct. 13, 1925.

1,556,980

UNITED STATES PATENT OFFICE.

FREDERICK K. VIAL, OF LA GRANGE, ILLINOIS, ASSIGNOR TO GRIFFIN WHEEL COMPANY, OF CHICAGO, ILLINOIS, A CORPORATION OF MASSACHUSETTS.

MOLDING MACHINE.

Application filed April 4, 1921. Serial No. 458,401.

*To all whom it may concern:*

Be it known that I, FREDERICK K. VIAL, a citizen of the United States, residing in La Grange, in the county of Cook and State of Illinois, have invented a new and useful Improvement in Molding Machines, of which the following is a specification.

This invention relates in general to foundry equipment and has for its object certain improvements in conveyer and molding machine construction and arrangement of the general character set forth in application for United States Letters Patent Serial No. 329,682, filed by Algot A. Wickland and myself, on October 10, 1919, for molding machines.

This invention contemplates the direct delivery of the finished molds from a molding machine on to a conveyer, preferably consisting of a series of trucks intermittently advanced past the molding machine and then past other operating stations incident to the making of finished castings in a foundry. The apparatus used for the purpose of illustration is particularly adapted for the manufacture of articles of the character of railway car wheels but it will, of course, be readily manifest that it has valuable use in the manufacture of other articles, heavier and lighter and of different size and shape than that for which this particular machine was constructed.

The invention has for a further object the facilitation of the delivery of the flasks to the molding machine and of the finished molds to the conveyer.

Another important object of the invention is the facilitation of the sand distribution and the simplification of the arrangement of the sand delivering and distributing parts and providing also for the delivery of sand at a plurality of molding stations.

The machine in which this invention is embodied for the purpose of illustration is particularly adapted to permit the molding operations to be carried on at different stations upon succeeding molds, the work done upon each mold at the several stations requiring substantially uniform time periods so that the molding operation may be carried on at the several stations in a closely adjusted and highly efficient and economical cycle.

Numerous other objects and advantages of the invention will be apparent as it is better understood from the following description, which, taken in connection with the accompanying drawings, discloses a preferred embodiment thereof.

Referring to the drawings,

Fig. 7 is a plan view of the mold carrier of the molding machine; and

Figs. 8 and 9 are respectively side and top views of the mold cushioning means.

Figure 1:
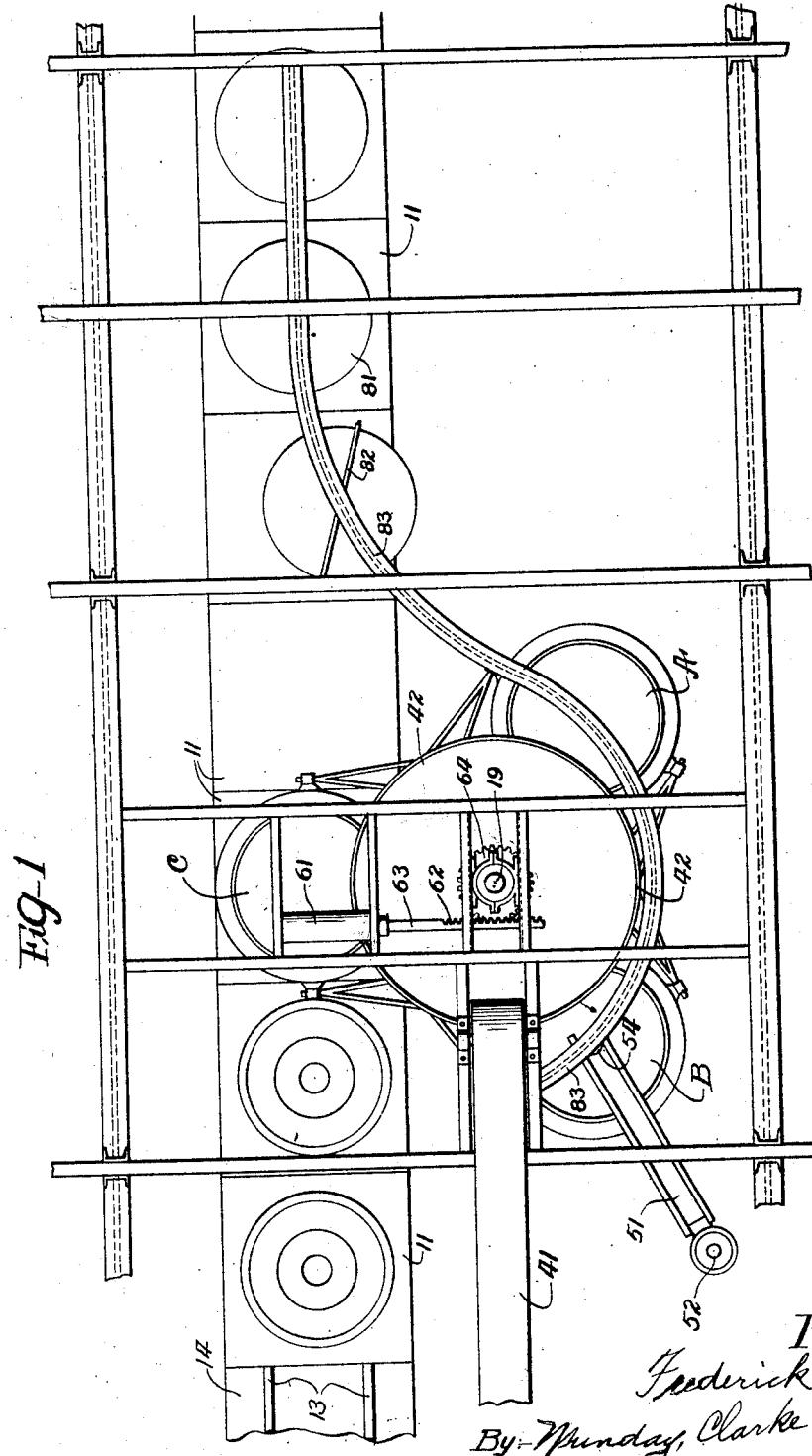
Figure 1 is a top plan view of so much of a foundry equipment as is necessary to an understanding of the present invention.
Figure 2:
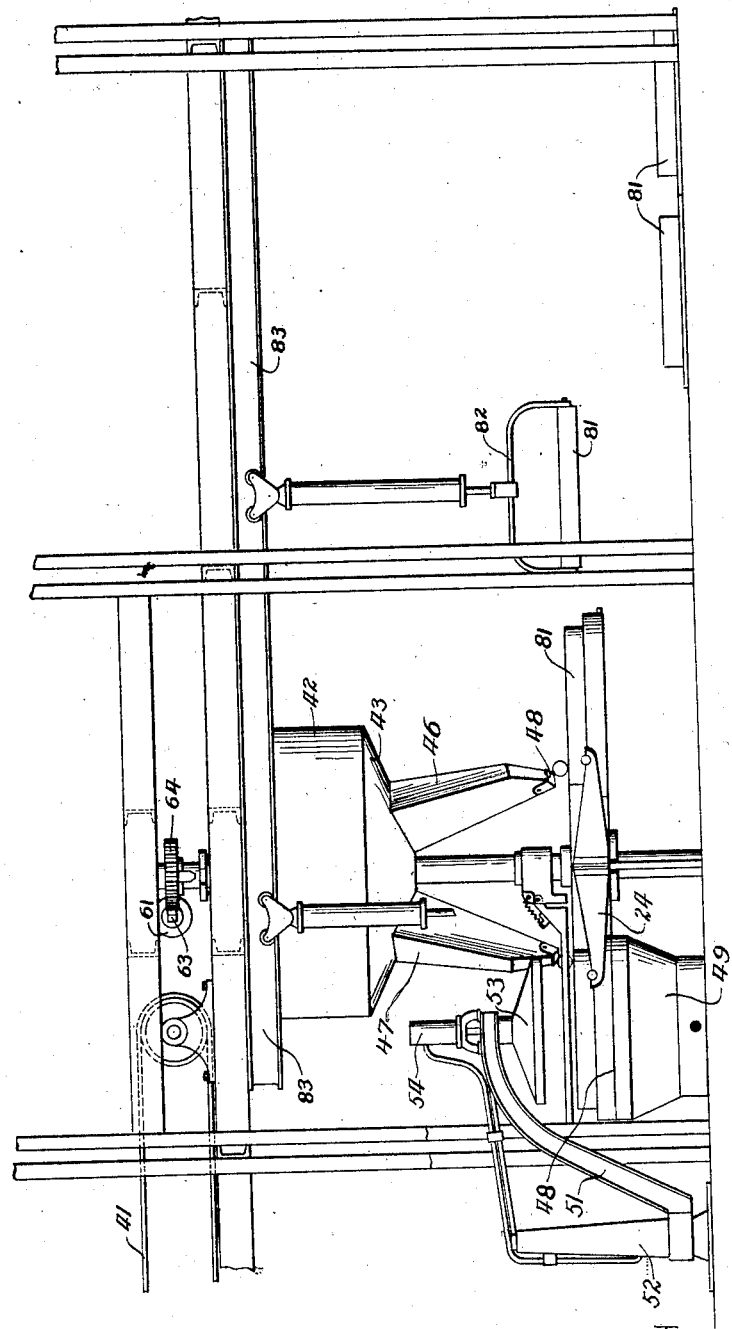
Fig. 2 is a side elevation thereof.
Figure 3:
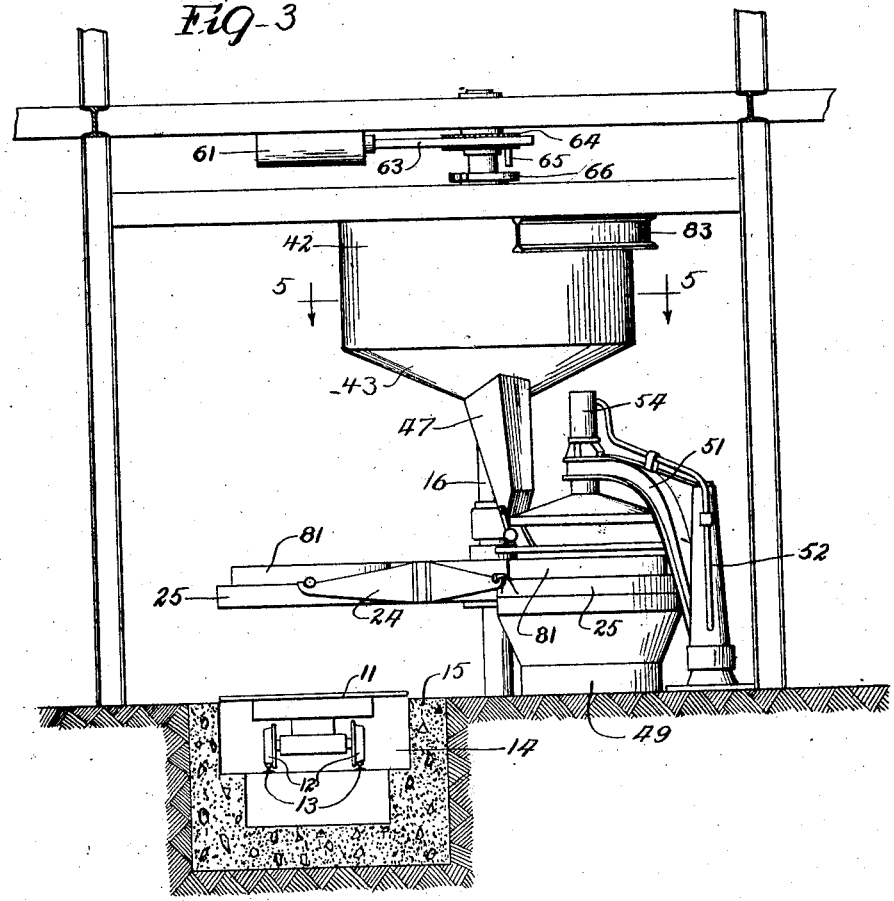
Fig. 3 is a transverse section taken across the conveyer system and at the left of the molding machine shown in Fig. 1.
Figure 5:
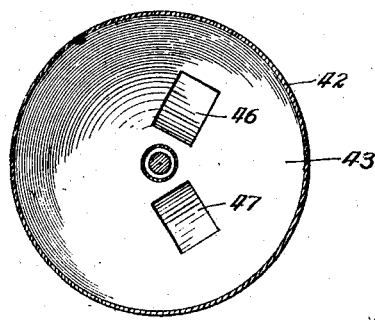
Fig. 5 is a section on the line 5—5 of Fig. 3.
Figure 4:
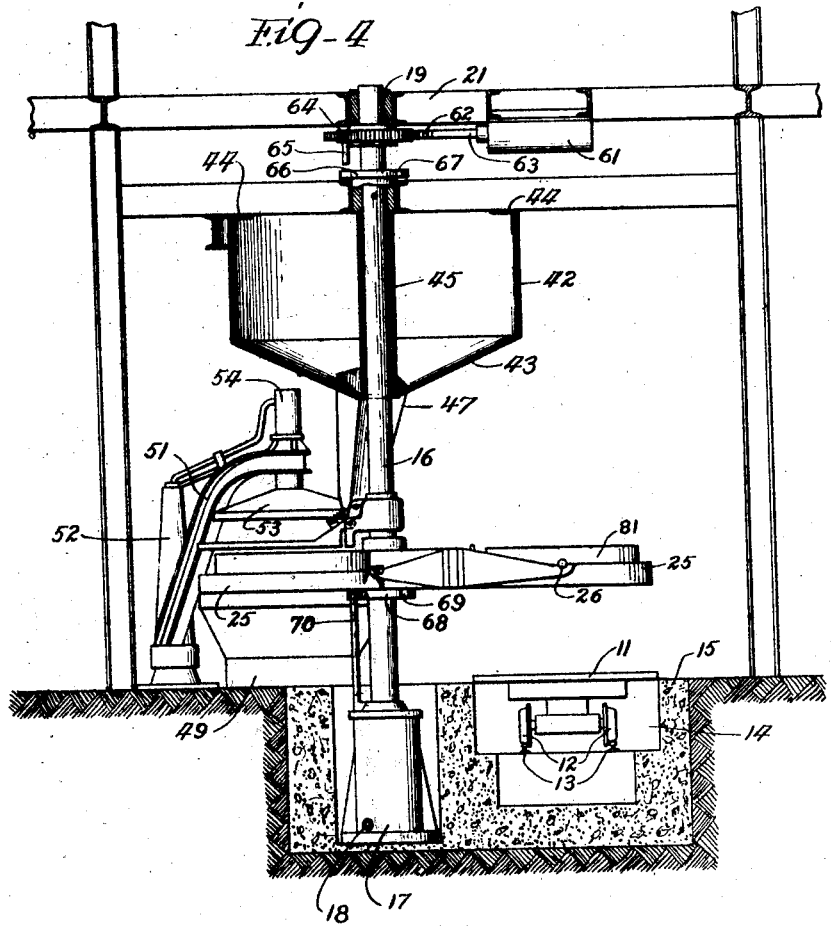
Fig. 4 is a similar view taken from the other side.

For the purpose of illustrating my invention I have shown on the drawings a conveyer system composed of a series of trucks 11 having preferably square or rectangular bodies or platforms and supported upon wheels 12 running on tracks 13 located in a passageway 14 beneath the floor level 15, the construction and arrangement being such that the platforms of the trucks are at or about the floor level. It will be understood that this conveyer moves past a number of stations (not shown on the drawing) at which pouring, cooling, shaking, and other incidental necessary operations are performed.

Figure 6:
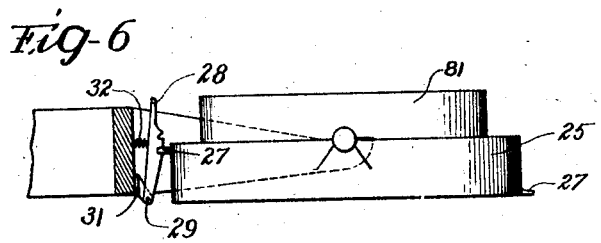
Fig. 6 is an enlarged partial section showing a locking device for the flask.

Adjacent the trucks or conveyer units is arranged a molding machine. This molding machine comprises a central shaft 16 having its lower end arranged in a fluid pressure cylinder 17, preferably of hydraulic character, water under pressure being admitted and released through a conduit indicated at 18. The shaft 16 has bearing at 19 in a suitable structural iron framework 21. A mold carrier is rigidly fixed upon this shaft and is adapted to be rotated with the shaft when the shaft is rotated and to move vertically under the action of the ram or fluid pressure member 17. This carrier comprises central spider members 22 located within a main framework 23 of triangular form. From each leg of the triangular framework 23 two arms 24 extend out and provide for the pivotal support of mold supports 25, each having trunnions 26 normally resting upon the tops of the arms 24. The molds are held against inadvertent turning by lugs 27 arranged as shown in Fig. 6 upon opposite sides, which engage locks 28 pivoted at 29 on ears 31 on the triangular framework and normally pressed out by springs 32. Each lock 28 is provided with a recess for receiving the lugs 27 when the mold is in mold receiving position as shown in Fig. 6.

It is intended that the mold support have the pattern fastened to it or be integral with it and that the flasks be locked to it in any suitable fashion. The turret moves past the operating stations, at each of which a predetermined portion of the mold forming is accomplished. At the first station, namely that located at A in Fig. 1, the pattern is cleaned, the numbers set, if numbers are to be employed, the flask part placed in position and locked and facing sand is riddled in and the pockets tucked, some additional sand being put in here at this station, if desired. At the second station, that indicated at B, the flask part is filled with sand and rammed. Additional sand is added and rammed. Any surface sand is struck off and the bottom placed in position and clamped. At the third station, that indicated at C, the mold is inverted, the pattern drawn and the mold placed on the conveyer to be carried to the pouring station (after having received its companion part) and the pattern plate or support is reverted to its normal position. These three operating stations and the mold supports are, of course, located at intervals of 120° about the shaft 16 and are the stations at which the various mold supports are brought to rest in the operation of the apparatus.

The operations performed at the station A are preferably performed manually and by one or more attendants working constantly at this station. It will, however, be manifest that some or all of these operations or steps may be performed by automatic or semi-automatic agencies.

Sand is delivered by a belt 41 mounted in the structural iron framework, already mentioned, to a circular hopper 42 having a conical bottom 43 and supported at 44 from said framework 21. This hopper surrounds the shaft 16 and has an internal sleeve 45 keeping the sand away from the shaft. From it two chutes, identified respectively by reference characters 46 and 47, extend down to adjacent the stations A and B and each is closed by a gravity closure 48 adapted to be opened by an attendant to permit the sand to run into the flask as his needs may require.

At the station B a compressor or flask rammer is provided. Beneath the mold support is a vertically movable table 49 adapted to be raised by a suitable fluid pressure or other means to lift the mold and mold support slightly above the mold carrying arms 24.

An arm 51, pivoted upon a support 52, is mounted adjacent the table 49 and this arm carries a head 53 adapted to be disposed over the sand body in the flask and normally held up by a fluid pressure device 54. The head may be let down by the fluid pressure device to co-operate with the table in compacting the sand. During this action the lock for holding the mold should be released and held out of action. This the operator may do by engaging its top end and merely pulling it back. Additional sand may be added by swinging the arm 51 out of the way and opening the gate or closure 48 and the sand thus added may be compressed by again operating the table 49 and head 53. After this the sand is struck off and the bottom board placed in position and locked in any usual or preferred fashion.

The next movement of the carrier brings this particular mold support over one of the truck units of the conveyer where it is inverted and placed upon the truck to be carried to the pouring station. This inversion is accompanied by merely pulling back the upper end of the lock 28 and turning the flask over. When the mold support raises after this action the pattern is drawn with it and upon reversion the mold and pattern are ready for return to station A. It will be understood that the companion mold part is positioned at a subsequent station in the conveyer travel.

The lowering occurs by the downward movement of the carrier permitted by the thrust cylinder 17. It will be noted that this movement is more than sufficient to permit the next succeeding mold support to rest on the table 49 of the compacter, this last mentioned mold support being in effect thus lifted off the arms and again picked up after the compacting is completed.

Rotation of the carrier is imparted intermittently and by a cylinder 61 and through the agency of a rack 62 on the piston or plunger rod 63. This rack engages a gear 64 having a pin 65 extending down from its underside. Upon the shaft 16 is mounted a collar 66 having three slots 67 adapted for engagement by the pin. A lower collar 68 is mounted above the cylinder 17 and has similar notches or openings 69 adapted for engagement by a pin 70 extending up from the top of the cylinder. It will be noted that the length of these pins is such that when the one collar is in engagement with its companion pin the other collar is in disengaged position. These two pins provide for the alternate locking of the shaft to the actuating gear 64 and to the stationary non-rotating cylinder 17.

When the mold is inverted it is brought to rest against a cushioning device shown best in Figs. 7 to 9. In this it will be noted that a block base 71 is provided upon each side member of the frame 23 and has ears 72 forming a bearing for a cushion lug 73 having top and bottom wings 74 and 75 each pressed upon by a spring 76 interposed between the base plug 71 and the adjacent wing. This device cushions the mold support in each of its movements in inversion and reversion as it will be readily understood.

The flasks, generally indicated at 81, are brought up on the trucks to or adjacent to the molding machine and are here picked up by the crane or trolley support 82 movable upon a track 83 from directly above the conveyer travel to over the station A where they may be lowered upon the mold support and the operation started. This truck preferably extends also past the stations and delivers the bottom boards onto the flasks as they are ready to receive them.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A foundry equipment, comprising in combination, a conveyer, a molding machine arranged adjacent thereto and having a rotatable member moving past a plurality of molding stations, said rotatable member moving above said conveyer at one point in its travel and adapted to deposit finished molds thereupon.

2. A foundry equipment, comprising in combination, a conveyer composed of a plurality of moving truck units, and molding machines arranged alongside the same and adapted to form molds at the side of the line of travel of the truck units of said conveyer and being movable to deposit the finished mold directly on said truck units.

3. A foundry equipment, comprising in combination, a conveyer composed of a plurality of moving truck units, and molding machines arranged alongside the same and adapted to deposit molds directly on the truck units of said conveyer, said molding machine including a vertically movable and rotatable mold carrier.

4. A foundry equipment, comprising in combination, a conveyer composed of a plurality of moving truck units, and molding machines arranged alongside the same and adapted to form molds at the side of the line of travel of the truck units of said conveyer and being movable to deposit the finished mold directly on said truck units, said molding machines including a series of mold carriers.

5. A foundry equipment, comprising in combination, a conveyer composed of a plurality of moving truck units, and molding machines arranged alongside the same and adapted to deposit molds directly on the truck units of said conveyer, said molding machine including a mold carrier pivotally mounted in said machine and movable to a position above a truck unit, whereby to permit it to be lowered into position on the truck unit after inversion.

6. A foundry equipment, comprising in combination, a conveyer, a molding machine arranged alongside the same and having a member movable above said conveyer and past a plurality of molding stations, a compacter located at one said station, mold supports carried by said member and to said compacter and to said conveyer, said member being vertically movable to arrange molds simultaneously on said conveyer and on said compacter.

7. A foundry equipment, comprising in combination, a conveyer, a molding machine arranged alongside the same and having a member movable above said conveyer and past a plurality of molding stations, a compacter located at one said station, mold supports carried by said member and to said compacter and to said conveyer, said member being vertically movable to arrange molds simultaneously on said conveyer and on said compacter, said compacter being located above said conveyer.

8. A foundry equipment, comprising in combination, a conveyer, a molding machine associated therewith, a track above said conveyer and extending to the side of a molding machine away from the conveyer, and a flask carrier on said track adapted to remove empty flasks from said conveyer and then to the molding machine, said molding machine being adapted to return finished molds direct to said conveyer.

9. A foundry equipment, comprising in combination, a plurality of trucks having intermittent movement, a molding machine past which said trucks move successively and arranged to deposit said molds directly to said trucks, and means lifting empty flasks from the trucks before they arrive at the molding machine and depositing them in said molding machine.

10. In a molding machine, the combination of a vertically movable and horizontally rotatable mold support carrier movable past a plurality of molding stations, mold supports pivotally mounted in said carrier, a fixed mold receiving station, said carrier when in upper position supporting the molds at a height to permit them to be inverted and when in lowered position placing them upon the mold receiving station.

11. In a molding machine, the combination of a rotatable turret movable past a plurality of molding stations, a central shaft about which said turret rotates, a sand hopper surrounding said shaft, and sand chutes for delivering said sand from said hopper into flasks on said carrier at each mold station.

12. In a molding machine, the combination of a rotatable turret movable past a plurality of molding stations, a central shaft about which said turret rotates, a sand hopper surrounding said shaft, and sand chutes for delivering said sand from said hopper into flasks on said carrier at a plurality of stations.

13. A foundry equipment, comprising in combination, a conveyer, a molding machine associated therewith, a track above said conveyer and extending to the side of the molding machine away from the conveyer, and a flask carrier on said track adapted to remove empty flasks from said conveyer and then to the molding machine, said molding machine being adapted to invert and to return finished molds direct to said conveyer.

FREDERICK K. VIAL.